United States Patent [19]
Savard

[11] Patent Number: 6,135,903
[45] Date of Patent: Oct. 24, 2000

[54] TENSION AND GUIDING DEVICE OF A CHAIN FOR BICYCLE CHANGE SPEED GEAR

[76] Inventor: Franck Savard, 11 Lotissement des Tertres, F-22400 Planguenoual, France

[21] Appl. No.: 09/254,202

[22] PCT Filed: Jul. 2, 1997

[86] PCT No.: PCT/FR97/01181

§ 371 Date: Mar. 3, 1999

§ 102(e) Date: Mar. 3, 1999

[87] PCT Pub. No.: WO98/01333

PCT Pub. Date: Jan. 15, 1998

[30] Foreign Application Priority Data

Jul. 3, 1996 [FR] France ................................ 96 08493

[51] Int. Cl.[7] .................................................. B62M 9/16
[52] U.S. Cl. .............................................. 474/80; 474/82
[58] Field of Search ............................ 474/78, 80, 82

[56] References Cited

U.S. PATENT DOCUMENTS

| 3,748,916 | 7/1973 | Morse | 474/82 |
| 4,637,808 | 1/1987 | Wakamura | 474/80 |
| 5,213,549 | 5/1993 | Blanchard | 474/82 |
| 5,730,670 | 3/1998 | Ferrarin | 474/80 |

FOREIGN PATENT DOCUMENTS

| 585472 | 3/1994 | European Pat. Off. . |
| 3403219A | 8/1985 | Germany . |

*Primary Examiner*—Sherry L. Estremsky
*Attorney, Agent, or Firm*—Young & Thompson

[57] ABSTRACT

A tension and guiding device of a chain (118) in a drive system with a sprocket (a–h) set and a gear (A, B, C) set, with a reverse rear derailleur coupling and reverse circular motion of the chain. The invention is applicable to bicycles equipped with a selective system of gear/sprocket combinations.

9 Claims, 4 Drawing Sheets

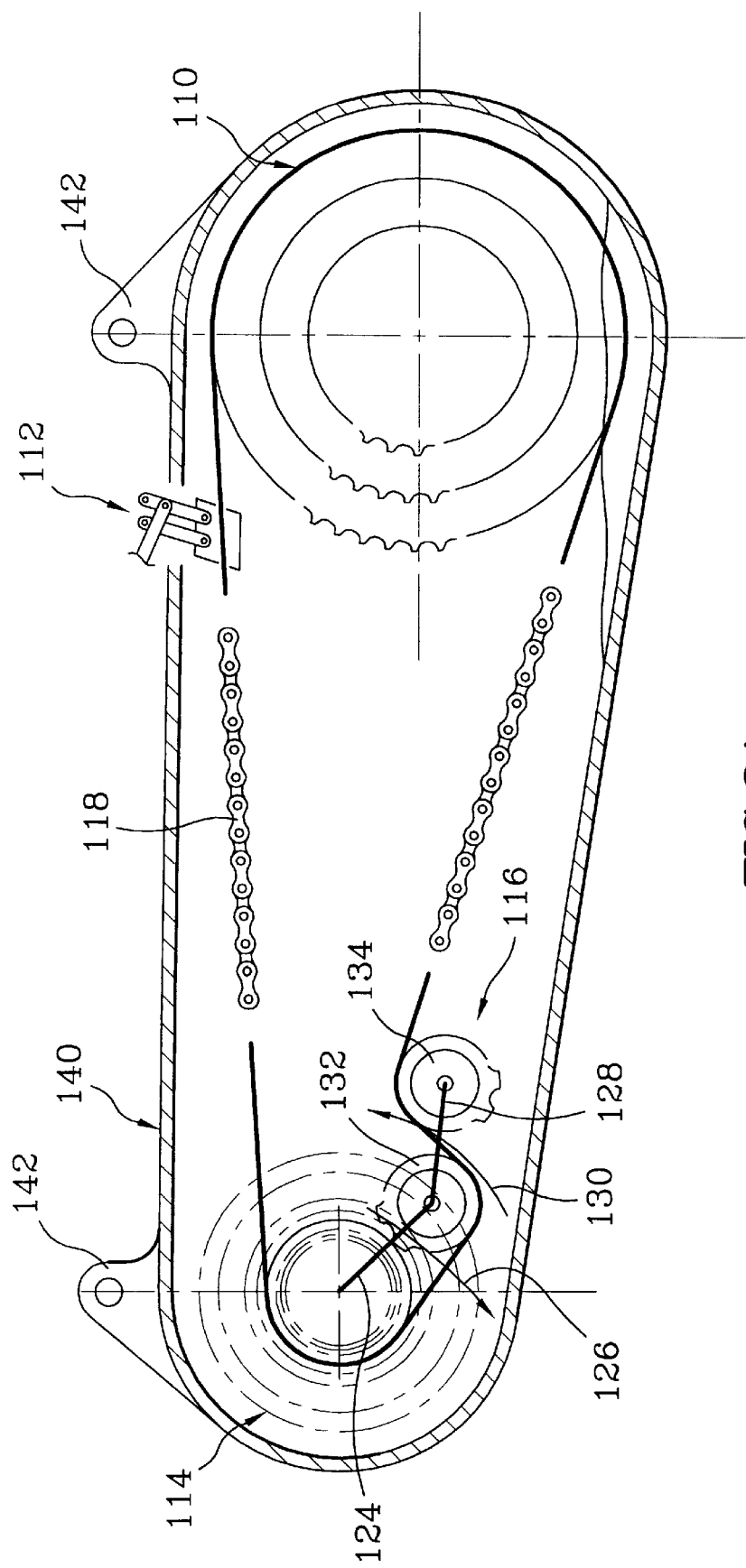

TENSION AND GUIDING DEVICE OF A CHAIN FOR BICYCLE CHANGE SPEED GEAR

FIELD OF THE INVENTION

The present invention relates to a device for tensioning and guiding a chain for a bicycle gearshift.

BACKGROUND OF THE INVENTION

There is known from European application EP-A-95450012.0, a process for gear selection as well as means to practice this process, in the name of the present applicant.

This invention has a high interest because the user has an increased predetermined gear selection, staged as a function of need, from among a much greater number of combinations but in which the redundancies in particular are numerous.

To achieve this high number of combinations, the bicycle is generally provided with several chain rings, secured in rotation with the crank axle, with a front derailleur to select them, gears secured to the rear wheel with a rear derailleur to select them as well as a chain connecting the chain rings and the gears.

SUMMARY OF THE INVENTION

The invention, which consists in selecting and synchronizing the gears, has as a result also limiting the chain crossings by omitting end crossings corresponding to the largest chain ring with the largest gear or the smallest chain ring with the smallest gear. Thus, such combinations are useless because the comparable gears can be obtained with other combinations having less influence on the length on the chain.

To compensate the variations of length of the chain, there is provided a tensioner with a guide in the form of a clevis comprising a pair of freely-rotating wheels one for guiding/derailing, the other for tensioning, provided with teeth adapted to coact with the openings of the chain.

The clevis is generally mounted rotatably at the end of an arm itself mounted rotatably relative to the frame. A return spring is interposed in line with each axis of rotation so as to exert a force having the tendency to cause the arm to pivot forwardly whilst the clevis is urged rearwardly relative to the arm. This mounting permits maximum taking up of the length of the chain in the take-up loop.

This double articulation permits compensating large variations of length of the chain but there can also be envisaged the case of an arm which is no longer movable but fixed. It should be noted that in any case a movable tensioning roller is required.

Between the arm and the clevis, in a known manner is at present interposed a deformable parallelogram which displaces this clevis in translation perpendicular to the plane of the bicycle, so as to guide the chain and to effect its derailing and the passage from one gear to another.

If this type of derailleur gives satisfaction in principle, it is nevertheless true that this element takes up space and reduces the clearance of the ground, rendering it vulnerable particularly for all-terrain usage.

Moreover, one can foresee placing in a casing the assembly of the drive, which is to say the chain, the rear derailleur and the front derailleur.

The casing should be sealed and contain a lubricant which, not only decreases friction and facilitates changing gears, but will protect the fragile members mechanically.

Efficiency will be improved by the fact that during outings or competitions, dirt, water and other particles cannot accumulate in places that might impede the good operation of the transmission.

On the contrary, it will be understood that, in the case of derailleurs of the prior art, the placing in a casing is unrealistic because it would be necessary to provide a volume corresponding to the maximum extension of the clevis.

The present invention overcomes these difficulties of the prior art by providing a tensioning and guiding device for the chain, which permits derailing the chain, but which is of reduced size, which permits placing it in a casing, which is suitable for existing bicycles, requiring only very small modifications, and which increases the ground clearance.

To this end, the tensioning and guidance/derailing device of a chain of a drive system for a set of pinions (a–h) and also a set of chain rings (A, B, C), for a bicycle comprising synchronized selection means of a limited number of chain rings/gear pairs, comprising a rear derailleur and a front derailleur, said rear derailleur comprising an arm and a clevis mounted rotatably relative to the arm with resilient return means interposed, said clevis comprising a jockey wheel and a tension wheel, characterized in that the chain passes below the jockey wheel and above the tension wheel, the return means for the clevis tending to move this clevis forwardly and upwardly.

According to another characteristic, the arm is mounted rotatably relative to the bicycle also by a resilient return means interposed between this arm and the bicycle, the resilient return means having the tendency to move the arm downwardly and rearwardly.

The power ratio of the resilient return elements is such that the arm is caused to move from the rear to the front and from below upwardly.

In the case of a modification, the arm is mounted freely or fixedly in rotation relative to the bicycle, only the resilient means interposed between the clevis and the arm ensuring positioning of the clevis.

According to another characteristic, the clevis bearing the tension wheel and jockey wheel is substantially always above the line L tangent to the largest chain ring and to the largest gear.

An interesting modification of the invention providing supplemental tensioning means, for example an arm articulated relative to the clevis with a freely rotatable wheel and resilient return means interposed between the clevis and this supplemental arm.

It is also possible to provide a protective sealed casing disposed about the chain ring/gear/chain and the two derailleurs.

BRIEF DESCRIPTION OF THE DRAWINGS

The invention is described hereinafter, according to a particular embodiment shown schematically in the accompanying drawings, in which drawings the different figures show:

FIG. 2A, a view of the guide and tensioning device according to the present invention, in the position in which the take-up loop is short, freeing all the chain corresponding to a least length.

DETAILED DESCRIPTION OF THE INVENTION

Figure 1A:
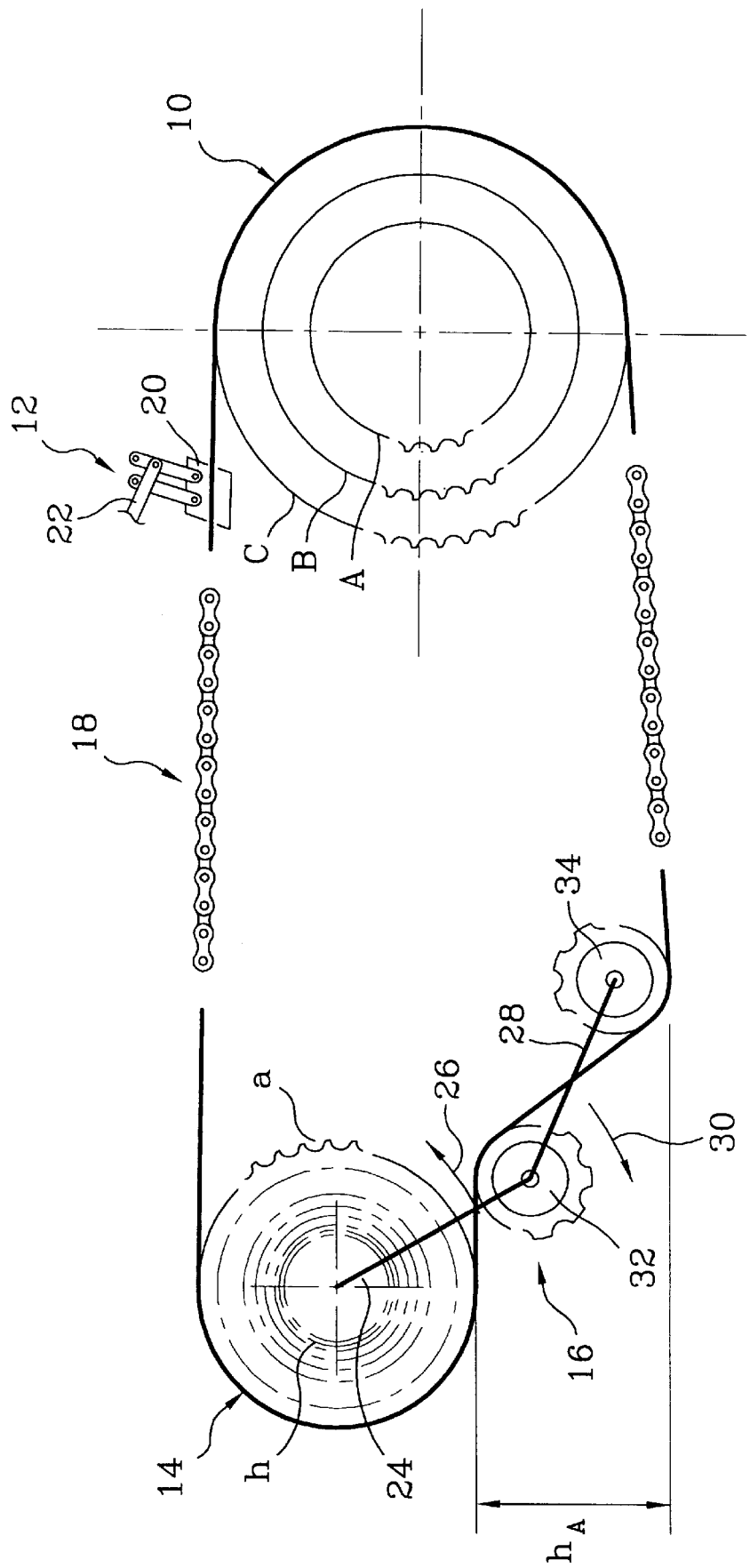
FIG. 1A, a schematic view of a chain ring/gear transmission device of the prior art, in the position in which the take-up loop is short, freeing almost all of the chain.

In FIG. 1A, there is shown a set of front chain rings 10 with a derailleur 12, a set of rear gears 14 with a derailleur 16, a transmission chain 18 engaging with the chain rings and gears.

The set of gear rings comprises three gear rings A, B, C from the smallest to the largest and a set of gears comprises eight gears a–h from the largest to the smallest, the small chain ring A being near the median plane of the bicycle and the large gear a being also near the median plane of the bicycle, on the interior side.

The front derailleur 12 is of known type and comprises a clevis 20 movable in a curvilinear path thanks to the interposition of a deformable parallelogram 22, the assembly being only symbolically shown because it is not part of the invention. The object is to obtain a displacement substantially perpendicular to the plane of the bicycle to permit the passage of the chain from one chain ring to the next.

The rear derailleur 16 comprises, in the illustrated embodiment, an arm 24 of the deformable parallelogram type, movable in rotation about its axis of connection to the bicycle, with resilient return means having the tendency to cause this arm to turn in the direction of the arrow 26.

A clevis 28 is rotatably mounted at the free end of the arm 24 with the interposition of a resilient return means having the tendency to cause the clevis 28 to turn in the direction of the arrow 30.

The clevis comprises a jockey wheel 32, and below the jockey wheel 32 a tension wheel 34 the chain passing above the jockey wheel 32 and below the tension wheel 34.

In the case shown in FIG. 1A, the chain 18 is positioned over the largest chain ring C and on the largest gear a, which requires the greatest length of chain, the take-up loop being the shortest.

In this case, the chain 18 describes substantially an oval between the chain rings and the gears, the jockey and tension wheels giving rise to the smallest possible deformation of the chain.

Figure 1B:
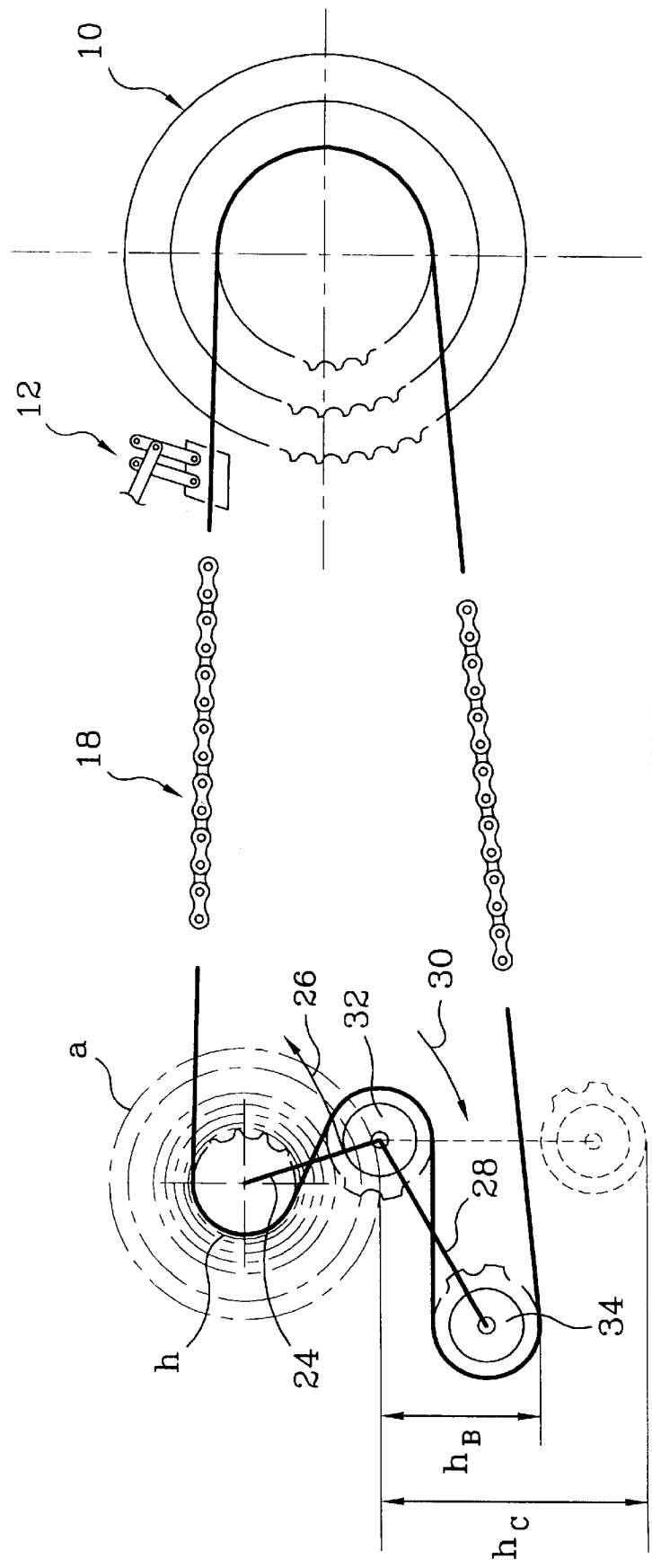
FIG. 1B, a view identical to that of FIG. 1A but in the position in which the take-up loop is long, taking up a large portion of the chain.

In the case shown in FIG. 1B, the chain is on the smallest chain ring A and the smallest gear h, so that it is necessary to take up the excess length of the chain. In this case, the parallelogram rises slightly perpendicularly to the plane of the bicycle when it is displaced to the small gear, and the spring acts in the direction of the arrow 26.

The clevis itself is urged rearwardly in the direction of the arrow 30, under the influence of the resilient return means which requires the chain to circulate in a very marked S shape, thereby ensuring the tensioning and the take-up of the free length of the chain, in the take-up loop.

It will be noted that the height $h_A$ and $h_B$ below the largest gear a is relatively great and that the clevis 28 is very exposed, and similarly, the complete derailleur is also very exposed.

Of course, the intermediate positions, represented in broken lines hc, lead to even more unfavorable end positions in which the tension wheel is vertically aligned with the jockey wheel.

Figure 2B:
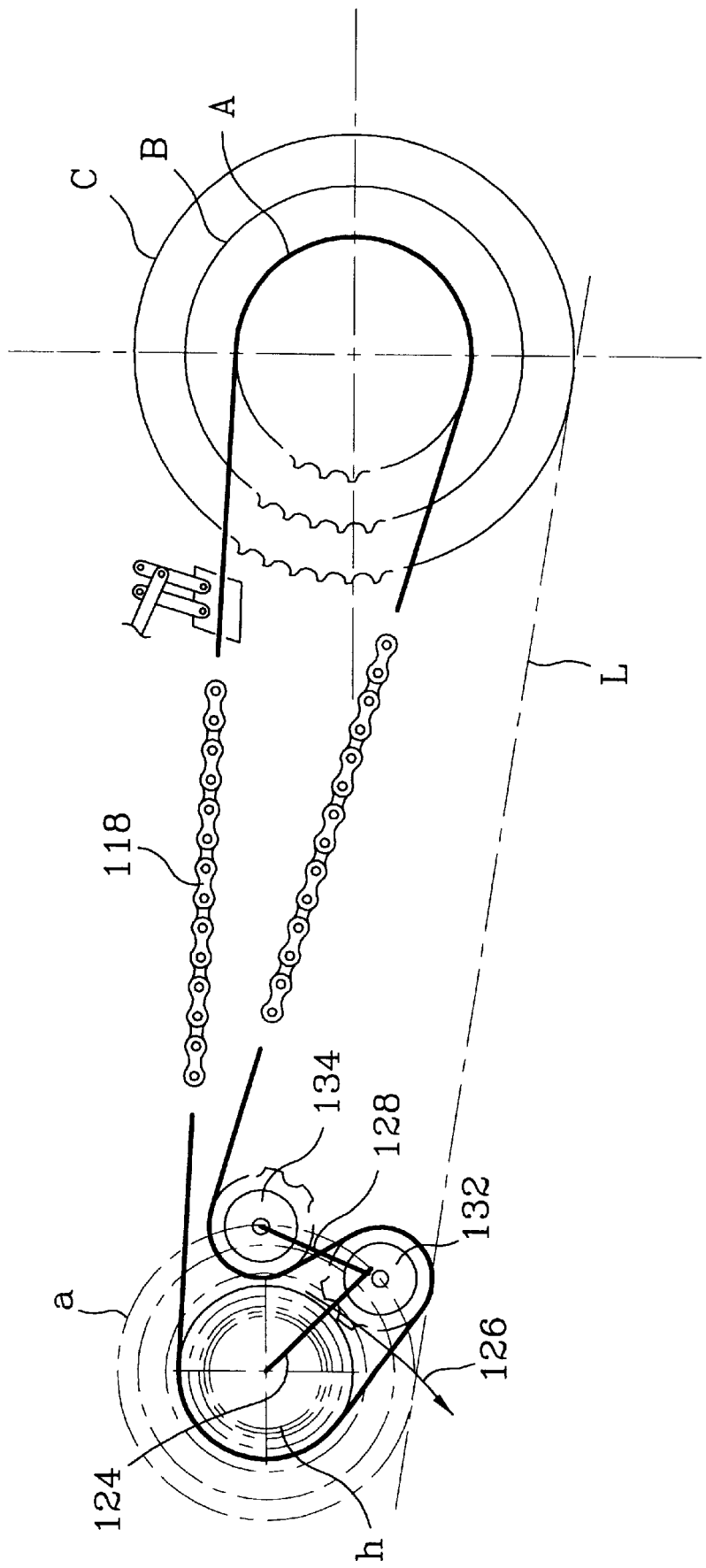
FIG. 2B, a view identical to that of FIG. 2A but with excess chain taken up, the take-up loop being long.

In FIGS. 2A and 2B, the same reference numerals are used but increased by 100.

Thus, in FIG. 2A will be seen the arrangement of the chain 118 which is located on the largest diameter gear ring C and on the medium gear which is one of the end positions corresponding to the gear setting giving the smallest take-up loop. It was indicated in the preamble that the position of FIG. 1A can in no case be reached in the case of FIG. 2A, which permits reducing the length of the chain.

In FIG. 2B, the gear selection is also an intermediate gear selection but is the one that corresponds to the longest length of take-up loop and to the greatest take-up of length of the chain. Thus, the smallest gear selection which would use the smallest chain ring A with the largest gear a, corresponds to less take-up of length of the chain.

On the contrary, the gear setting corresponding to the smallest chain ring A and to the smallest gear h, which is in a direction to require the greatest take-up of the chain, is never reached because it is a matter of an exact or approximate redundance with a prohibited chain crossing.

It will be noted on these two figures that the derailleur comprises an arm 124 which is also in this case a deformable parallelogram as are the derailleurs of the prior art, but shorter, because the take-up length is less, as is also true for clevis 128.

The articulation of the arm which is indicated in the illustrated embodiment, centered on the hub, can be provided at any other place.

In the illustrated embodiment, the resilient return means tend to turn the arm in the opposite direction from that of FIGS. 1A and 1B, that is to say rearwardly.

A clevis 128 is articulated relative to the arm 124 but the resilient return means ensures a rotation of the clevis forwardly, in the reverse direction of that of FIGS. 1A and 1B.

The clevis comprises, in the same way, a jockey wheel 132 and a tension wheel 134.

On the contrary, the mounting with the clevis reversed requires a modified circulation of the chain, which is to say that the chain passes below the jockey wheel and above the tension wheel, which is the very essence of the present invention.

It will be noted that the size of the derailleur is reduced and that its ground clearance is increased greatly. Thus, the clevis remains substantially above a line L tangent to the lower side of largest chain ring C and the underside of largest gear a.

It should be noted that the arm 124 is provided with resilient return means which urge it downwardly rearwardly, nevertheless there can be provided a fixed arm and only the tension wheel remains movable in oscillating rotation.

The respective strengths of the two resilient return means can be adjusted such that their resilient return constant permits the tensioning of the chain but in this case the arm 124 can be caused to pivot in one or the other direction of rotation.

According to another modification, the arm 124 is freely mounted omitting the resilient return means, only the tension wheel and its resilient return means ensuring the positioning of the clevis.

In FIG. 2A, a protective casing 140 has been provided, which permits permanent lubrication by an oil bath for example of the assembly of rotating members, beyond the purely mechanical protection and less vulnerability to shocks.

In this case, the casing is fixed to the bicycle more particularly to the frame, by the tongues 142. This type of device is applicable to rear suspension bicycles because the frame becomes an articulation element.

The large clearance with the ground will be noted, even if a casing is used.

According to another improvement, it is possible to add supplemental tensioning means, for example in the form of a freely rotatable wheel on an arm articulated relative to the clevis, with the interposition of resilient return means. Thus, the chain circulates below the first wheel, above the second wheel and about the third wheel.

The device which has been described is particularly useful with a gear shift device which utilizes only a partial number of synchronized combinations, so as to limit too great crossing of the chain and too great deflection from the useful length, of the take-up loop.

It will be noted again that all of the description has been given with respect to deformable parallelogram derailleurs, because this is the most common type of derailleur at this time, but the device according to the present invention is also applicable to any other derailleur in which it is necessary to compensate variations of the useful length of the chain.

It will also be noted in FIG. 1B that the length of the take-up loop below, is much longer in low gears, generally used in difficult and broken territory, which is prejudicial to good retention of the chain. Thus, wobbling takes place which leads to other drawbacks well known to users.

In FIG. 2B, the length of the take-up loop is considerably reduced, which nicely overcomes the drawbacks set forth above whilst giving other advantages such as the opportunity to use a housing.

What is claimed is:

1. Device for tensioning and guiding/derailing a chain (118) of a drive system with a set of gears (a–h) and also a set of chain rings (A, B, C), for a bicycle comprising synchronized selection means for a limited number of chain rings/gear pairs, comprising a rear derailleur (116) and a front derailleur (112), said rear derailleur comprising an arm (124) and a clevis (128) mounted for rotation relative to the arm with resilient return means therebetween, said clevis comprising a jockey wheel (132) and a tension wheel (134), characterized in that the chain (118) passes below the jockey wheel (132) and above the tension wheel (134), the return means for the clevis tending to move said clevis forwardly and upwardly.

2. Tensioning and guiding/derailing device according to claim 1, characterized in that the arm (124) is mounted for rotation relative to the bicycle with further resilient return means interposed between this arm and the bicycle, the resilient return means urging the arm downwardly and rearwardly.

3. Tensioning and guiding/derailing device according to claim 2, characterized in that the ratio of the strength of said resilient return means is such that the arm (124) pivots forwardly and upwardly.

4. Tensioning and guiding/derailing device according to claim 1, characterized in that the arm (124) is mounted freely rotatably relative to the bicycle, only the resilient means interposed between the clevis and the arm ensuring positioning of the clevis.

5. Tensioning and guiding/derailing device according to claim 1, characterized in that the arm (124) is mounted fixedly in rotation relative to the bicycle, only the resilient means interposed between the clevis and the arm ensuring positioning of the clevis.

6. Tensioning and guiding/derailing device according to claim 1, characterized in that the clevis carrying the tension wheel and the jockey wheel is substantially always above the line L tangent to the largest chain ring A and the largest gear a.

7. Tensioning and guiding/derailing device according to claim 1, characterized in that it comprises supplemental tensioning means.

8. Tensioning and guiding/derailing device according to claim 7, characterized in that the supplemental tensioning means comprise an arm articulated relative to the clevis with a freely rotatable gear and a resilient return means interposed between the clevis and this supplemental arm.

9. Tensioning and guiding device according to claim 1, characterized in that it comprises a protective casing (140), sealed, disposed about the assembly of the chain rings/gears/chain and the two derailleurs (112, 116).

\* \* \* \* \*